United States Patent
Watters (10) Patent No.: US 6,994,259 B2
(45) Date of Patent: Feb. 7, 2006

(54) METHOD AND APPARATUS FOR MAINTAINING COHERENCY OF SHARED STATE BETWEEN LOCAL AND REMOTE

(75) Inventor: Scott W. Watters, Forest Grove, OR (US)

(73) Assignee: Intel Corporation, Santa Clara, CA (US)

( * ) Notice: Subject to any disclaimer, the term of this patent is extended or adjusted under 35 U.S.C. 154(b) by 208 days.

(21) Appl. No.: 10/334,228

(22) Filed: Dec. 30, 2002

(65) Prior Publication Data

US 2004/0124247 A1   Jul. 1, 2004

(51) Int. Cl.
*G06K 7/10* (2006.01)

(52) U.S. Cl. .......................... 235/472.01; 235/472.02; 235/472.03

(58) Field of Classification Search .............. 235/375, 235/380, 472.01, 472.02, 472.03; 700/94
See application file for complete search history.

(56) References Cited

U.S. PATENT DOCUMENTS

| | | | | |
|---|---|---|---|---|
| 5,956,331 A | * | 9/1999 | Rautiola et al. | ............. 370/338 |
| 5,965,863 A | * | 10/1999 | Parker et al. | ............ 235/462.25 |
| 6,788,982 B1 | * | 9/2004 | Lapstun et al. | ................ 700/94 |
| 6,842,611 B2 | * | 1/2005 | Beck et al. | ............... 455/414.1 |

* cited by examiner

*Primary Examiner*—Karl D. Frech
(74) *Attorney, Agent, or Firm*—Blakely, Sokoloff, Taylor & Zafman LLP (57) ABSTRACT

A device is presented including a processor having a main memory. The processor includes a state synchronization process. A state memory is attached to the processor. A display, an interface and a transmitting/receiving device are also attached to the processor. The state synchronization process transmits state data to the state memory and to an external device.

35 Claims, 5 Drawing Sheets

METHOD AND APPARATUS FOR MAINTAINING COHERENCY OF SHARED STATE BETWEEN LOCAL AND REMOTE

BACKGROUND

1. Field

This invention relates to smart displays, and more particularly to synchronizing smart display state data in remote and local modes.

2. Description of the Related Art

Smart displays, for example Microsoft's® Mira (derived from the Spanish language for "to watch"), enable users the freedom of running a software application remotely on a "base" computer in remote mode or on a smart display in local mode. Smart displays are modal. That is, local applications can only be run when a remote session is not active.

Smart displays are wireless monitors that use Institute of Electrical and Electronic Engineers (IEEE) 802.11a or WiFi (Wireless Fidelity) 802.11b (IEEE Standard for Local EEE 802.11a-1999 (ISO/IEC 8802-11:1999/Amd 1:2000(E)), Information technology—Telecommunications and information exchange between systems—Local and metropolitan area networks—Specific requirements—Part 11: Wireless LAN Medium Access Control (MAC) and Physical Layer (PHY) specifications—Amendment 1: High-speed Physical Layer in the 5 GHz band; IEEE 802.11b-1999 Supplement to 802.11-1999, Wireless LAN MAC and PHY specifications: Higher speed Physical Layer (PHY) extension in the 2.4 GHz band) technology for transmitting/receiving signals to/from another computer(s). Smart displays have embedded operating systems, such as Microsoft® Windows® CE.NET. Smart Window devices make it easy for a user to travel around an environment, such as a home, without having to carry or move their personal computer with them. The smart display device can run applications that used to be run solely on the personal computer. For example, a smart display device can run a television remote control program.

A problem that exists, however, is that since the smart display device is modal (meaning that either the smart display is running an application in a local mode, or that the base computer is running the application in a remote mode, but the smart display cannot run the application while the base computer is in remote mode) the state data stored on the base computer can easily become out of synchronization with the state data stored on the smart display.

BRIEF DESCRIPTION OF THE DRAWINGS

The embodiments are illustrated by way of example and not by way of limitation in the figures of the accompanying drawings in which like references indicate similar elements. It should be noted that references in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances "an embodiment," "one embodiment," or "some embodiments," are not necessarily all referring to the same embodiments. If the specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

DETAILED DESCRIPTION

The invention generally relates to a system. Referring to the figures, exemplary embodiments of the invention will now be described. The exemplary embodiments are provided to illustrate the invention and should not be construed as limiting the scope of the invention.

Figure 1:
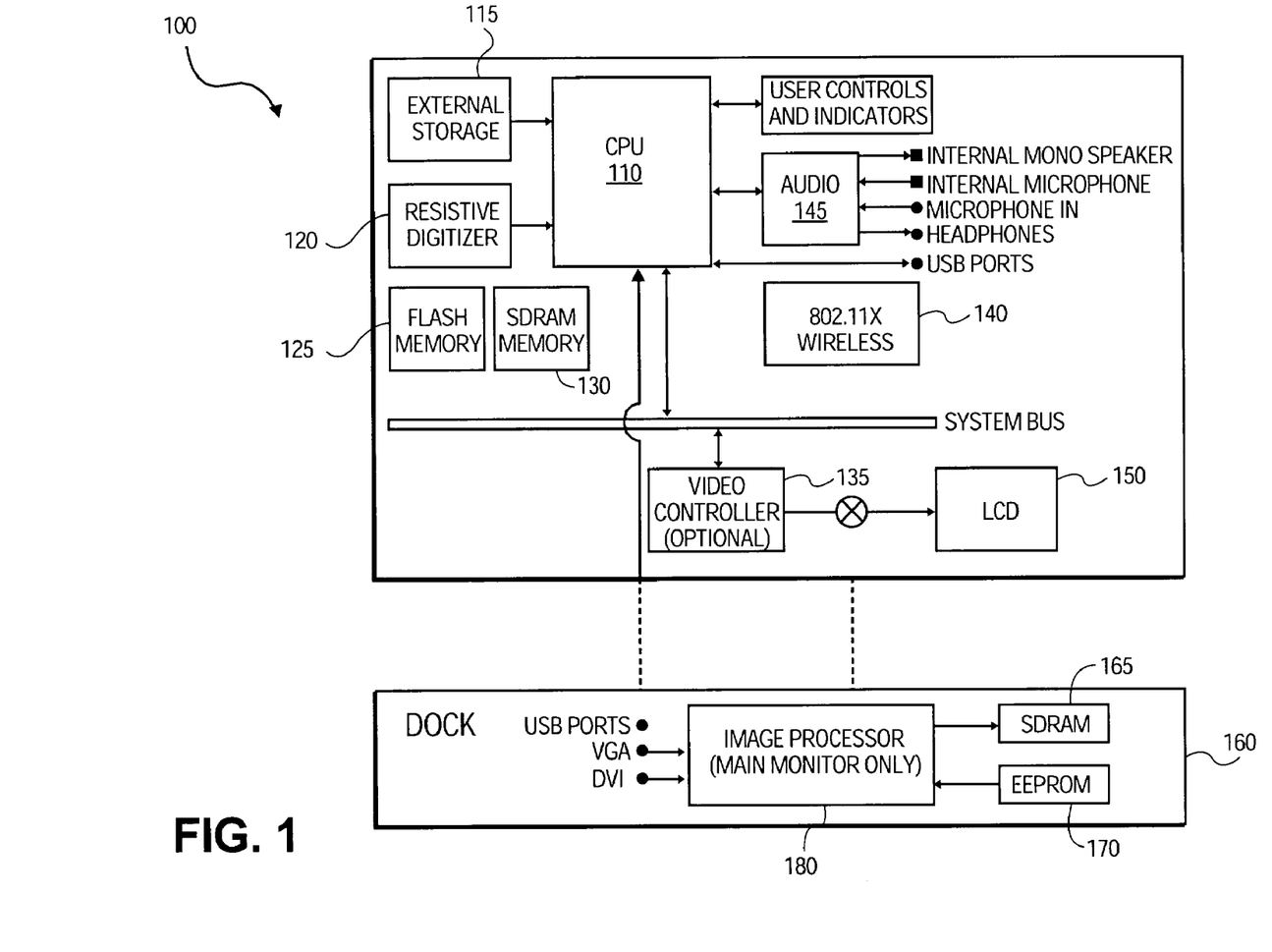
FIG. 1 illustrates a typical smart window device.

FIG. 1 illustrates a typical smart display having an optional docking for using with a main or base personal computer (PC). It should be noted that the main or base computer can be a workstation or notebook type of computer. Smart display 100 includes central processing unit (CPU) 110, external storage device 115, resistive digitizer 120 (i.e., touch-screen interface), flash memory 125, synchronous dynamic random access memory (SDRAM) 130, optional video controller 135, an IEEE 802.11x wireless device (where x denotes the latest release, e.g., a, b, g, etc.), audio components 145, liquid crystal display (LCD) 150, and optional dock 160. Optional dock 160 includes SDRAM 165, electrically erasable programmable read-only memory (EEPROM) 170 and image processor 180.

Smart display 100 can run any suitable operating system (OS), such as Windows® CE.net, Windows® CE 3.0, etc. In a smart display or device using a Windows® CE based operating system, such as smart display 100, a storage area known as the registry exists. Registry information can be stored on flash memory 125, as well as SDRAM 130. The operating system stores data with information about applications, user preferences and configuration settings. For example, a user's default settings for an application are stored in the registry.

The registry is organized in a hierarchical system of keys and values. A key is similar to a directory and can contain values and other keys. A value is the basic piece of data that is stored in the registry. The value can be a variety of types, including string or binary. Each value has a name and an associated piece of data. In Windows® CE operating systems (such as Windows® CE 3.0), three root keys are supported. The first root key is related to hardware and driver configuration data. The second root key is related to user configuration data. The third root key is related to object linking and embedding (OLE) and file-type matching configuration data.

In the Windows® CE 3.0, a key or value name length is limited to 255 characters. The data size is 4 KB, and the key hierarchy depth is up to 16 nested subkeys. The Windows® CE registry exports the WIN32 registry functions for applications to call for recording and accessing run-time and other data. The registry can be used to store data needed by software applications to call for recording access run-time and other data. One use for the registry is to store data that an application needs for each session. Therefore, the state of an application can be stored during events such as application shutdown. Thus, upon start-up, the previous settings can be reinstated. It should be noted that the registry is also used for system initialization, and is always present in random-access memory (RAM). In Windows® CE versions effective from 2.10, the registry can be loaded from, and stored to, other persistent storage devices.

Smart display 100 can communicate over a wireless channel (also known as virtual channel) via 802.11x wireless device 140 with other devices using an 802.11x wireless device. The wireless devices make it possible for devices using the wireless devices to move away from another and still be able to communicate.

Figure 2:
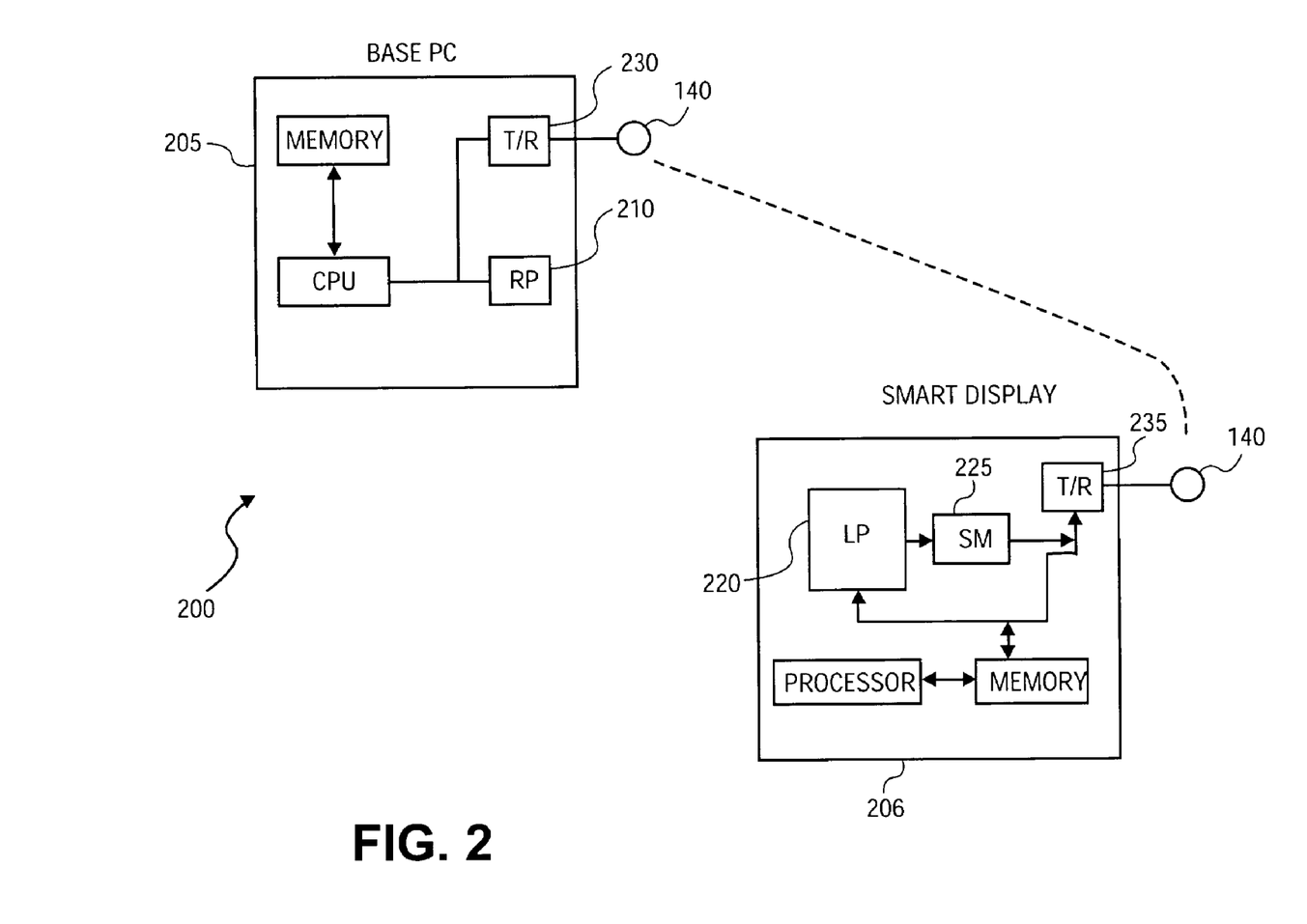
FIG. 2 illustrates an embodiment including a smart display including a state memory device and synchronization process.

FIG. 2 illustrates an embodiment including base PC 205 and smart display 206. In this embodiment, base PC 205 has transmitting/receiving process 230 and smart display 206 has transmitting/receiving process 235. Transmitting/receiving processes 230 and 235 each communicate through IEEE 802.11x wireless devices 140. Wireless devices 140 can be devices such as Cisco's® Aironet 350 or 1200 series devices, etc.

Base PC 205 and smart display 206 can run similar application processes, such as a remote control application for a home, office or entertainment environment. Note that smart display 206 and base PC 205 are fitted with remote control transmitters or repeaters, such as radio frequency (RF), infrared (IR), etc. type devices in order to effect the remote control commands (the RF, IR, etc. devices are not illustrated). Smart display 206 is modal. That is, smart display 206 can run an application in either a local mode or a remote mode, in accordance with base PC 205. Therefore, when an application runs in remote mode (i.e., the application is running on base PC 205, illustrated by remote process 210), smart display 206 cannot run the application locally at the same time. In the example of using a remote control application, when base PC 205 runs the application remotely, smart display 206 cannot run the application locally. Therefore, in this scenario, smart display 206 can be used as a user interface, i.e., a remote control interface through a resistive digitizer.

When smart display 206 runs an application locally (i.e., local mode), such as a remote control application, base PC 205 cannot run the remote control application remotely at the same time. Therefore, smart display 206 acts as the user interface and the controlling logic for a remote control application. In one embodiment, base PC 205 and smart display 206 use state data synchronizing processes in order to synchronize state data between base PC 205 and smart display 206. Without synchronizing state data with each other, base PC 205 and smart display 206 can have different startup state data, or have different state data on each other when a mode is switched from remote to local or vice versa. Therefore, without using an embodiment having synchronizing processes on base PC 205 and smart display 206, it would be up to a user to know the exact mode the application (e.g., remote control application) is running in, and the state of the state data on each device. Moreover, by using an embodiment having synchronizing processes on base PC 205 and smart display 206, a user does not have to take the time, nor is required to, enter data on base PC 205 and smart display 206 in order to synchronize both devices.

As illustrated in FIG. 2, smart display 206 includes state memory 225. In one embodiment, state memory 225 is an additional non-volatile memory device, such as a flash memory device used solely for storing application state data to be synchronized between two or more devices. In another embodiment, state memory 225 can be a text file stored on memory device, such as a hard disk, flash memory, RAM, etc. In still another embodiment, state memory 225 can be a data base stored on a memory device, such as a hard disk, flash memory, RAM, etc.

Another embodiment using a Windows® CE OS, state memory 225 is stored in the registry. In this embodiment, for example, state data for a remote control application can include user preferences, default values, last entertainment setting, last appliance setting, etc. Since remote control applications can handle sequences of startup commands for desired settings, if data is not synchronized problems can arise such as base PC 205 can have a morning setting and smart display 206 can have a night time setting. For example, a morning setting may comprise a sequence of commands such as, open blinds, turn off lights, reset thermostat, set volume to moderate, select news station on television receiver, start coffee maker, etc. And a night time sequence may comprise, close blinds, turn lights on, set volume to low, select movie channel, set thermostat to nigh time setting, turn on gas fireplace, etc. Besides these differences, suppose a user's last state included having the volume set to a moderate level for a music station when local process (i.e., local mode) 220 is run on smart display 206. If the user decides to relocate to the location where base PC 205 is located and, accordingly, switches to remote mode from smart display 206's perspective (i.e, decides to now run the process on base PC 205), it is likely the user will have to reset these settings for remote process 210 since the state data last stored in remote mode would not be synchronized with the last state of data that local process 220 used. Therefore, state data synchronization processes on base PC 205 and smart display 206 synchronize state data between base PC 205 and smart display 206 upon a synchronization event occurring. It should be noted that while state data is synchronized, that the various embodiments discussed herein can also be used to synchronize other data, such as application or user data.

Figure 3:
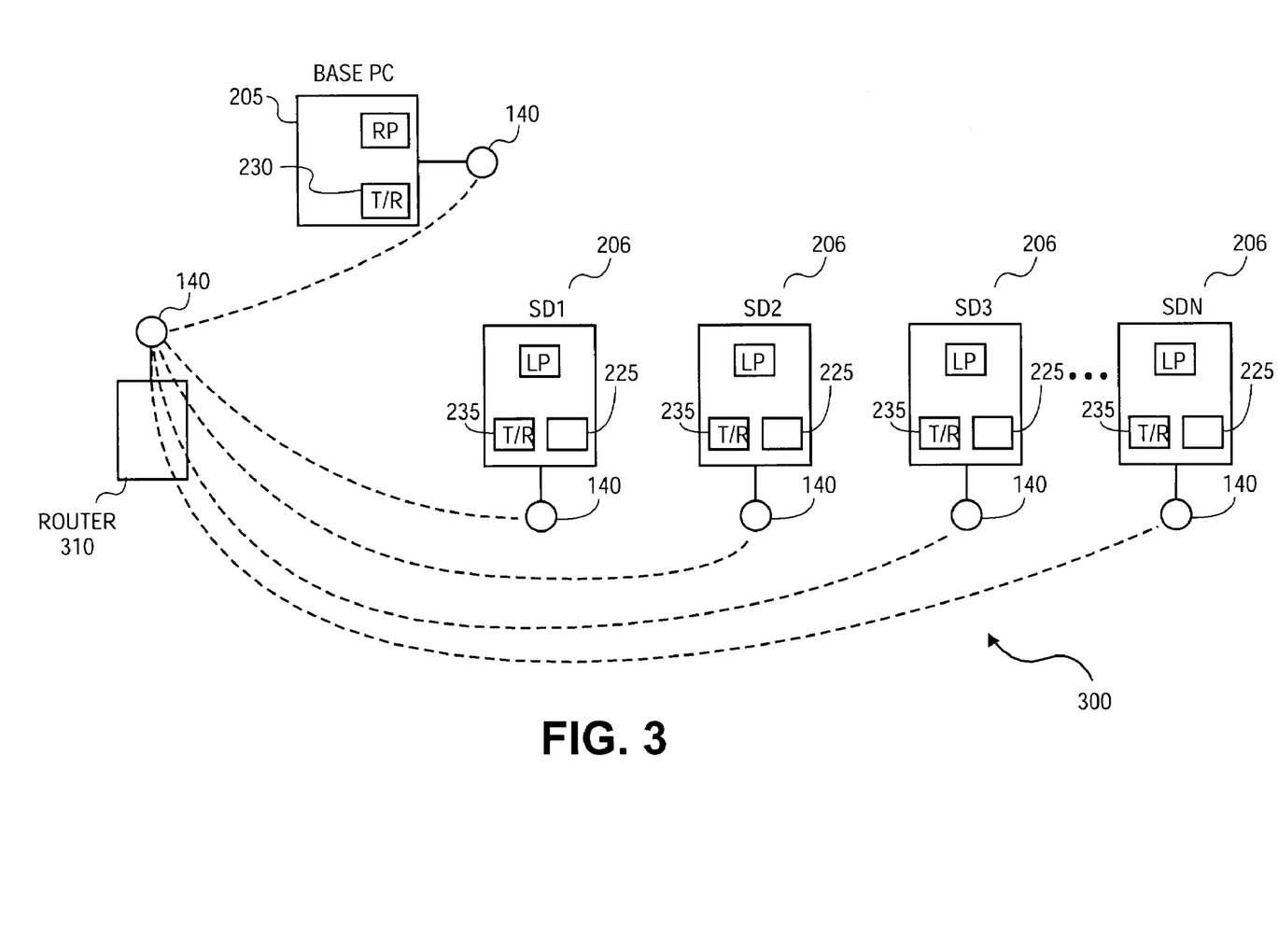
FIG. 3 illustrates another embodiment including a plurality of smart window devices including a state memory device and synchronization process.

FIG. 3 illustrates an embodiment having a plurality of smart displays 206 that communicate with base PC 205 through router 310. In this embodiment, different users can each have separate smart displays 206. For illustrative purposes, the following example demonstrates an example use for one embodiment. In this example, a household has a plurality of users. An application that can be run remote on base PC 205 and locally on smart display(s) 206 is used for remote control purposes. Therefore, similar to the remote control example, a code is transmitted from either base PC 205 or smart display(s) 206 through an RF, IR, etc. device in order to control household device. In this example, there are smart displays 206 in rooms 1 through n (where n can be a number such as 2, 3, 4, 5, etc.) If, for example, a user travels from room to room and uses a different smart display 206 (each running in local mode on smart displays 206) at different areas and/or times, each local process running on each smart display 206 can have different state data stored to state memory 225. Therefore, an embodiment synchronizes state data between smart displays 206 based on synchronization events.

In one embodiment, smart display 206 has an interface, such as a button, a switch, etc. that is used as a synchronization event to synchronize state data between a smart display (such as smart display 206) and a base PC (such as base PC 205). In this embodiment, the interface causes a signal to be sent out on smart device 206. Different mechanisms can be used to send/receive the signal, such as drivers, processes, direct hardware, etc. In other embodiments, events such as start-up, shutdown, mode change (i.e., local to remote or vice versa), after a predetermined amount of time, etc., are used as synchronization events. Once a synchronization event occurs, in one embodiment, processes are launched on a base PC (such as base PC 205) and one or more smart displays 206 to transmit state data to/from the device running in remote or local mode in order to synchronize state data of an application, such as a remote control application. It should be noted that while a remote control application is used as an example, other applications can have state data synchronized as well. Since base PC 205 and smart display 206 use wireless communication devices, such as 802.11x device 140, state data is transmitted between the devices through a virtual channel upon a synchronized event occurring.

In one embodiment, state data for an application, such as a remote control application, can be stored externally from base PC 205 and smart display 206 in addition to being stored locally, such as in a registry or state memory device 225. In this embodiment, state data can be stored by a service provider and accessed through a network, such as a local area network (LAN), wide area network (WAN), the Internet, etc. In this embodiment, after a synchronization event occurs, a process on base PC 205 and/or smart display 206 can retrieve the state data from the service provider so that state data is synched between both devices.

Figure 4:
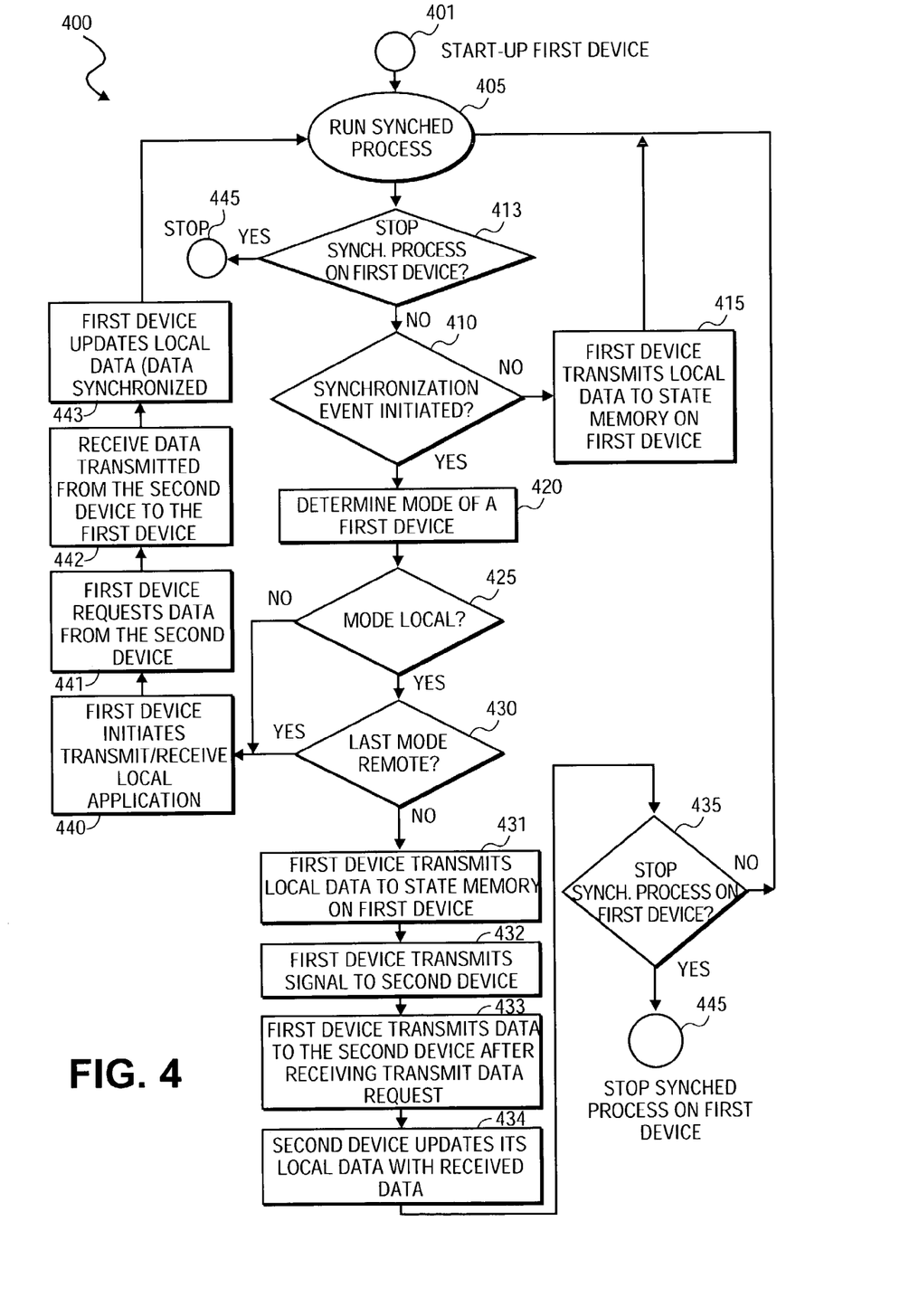
FIG. 4 illustrates a process for an embodiment from a first device's perspective.
Figure 5:
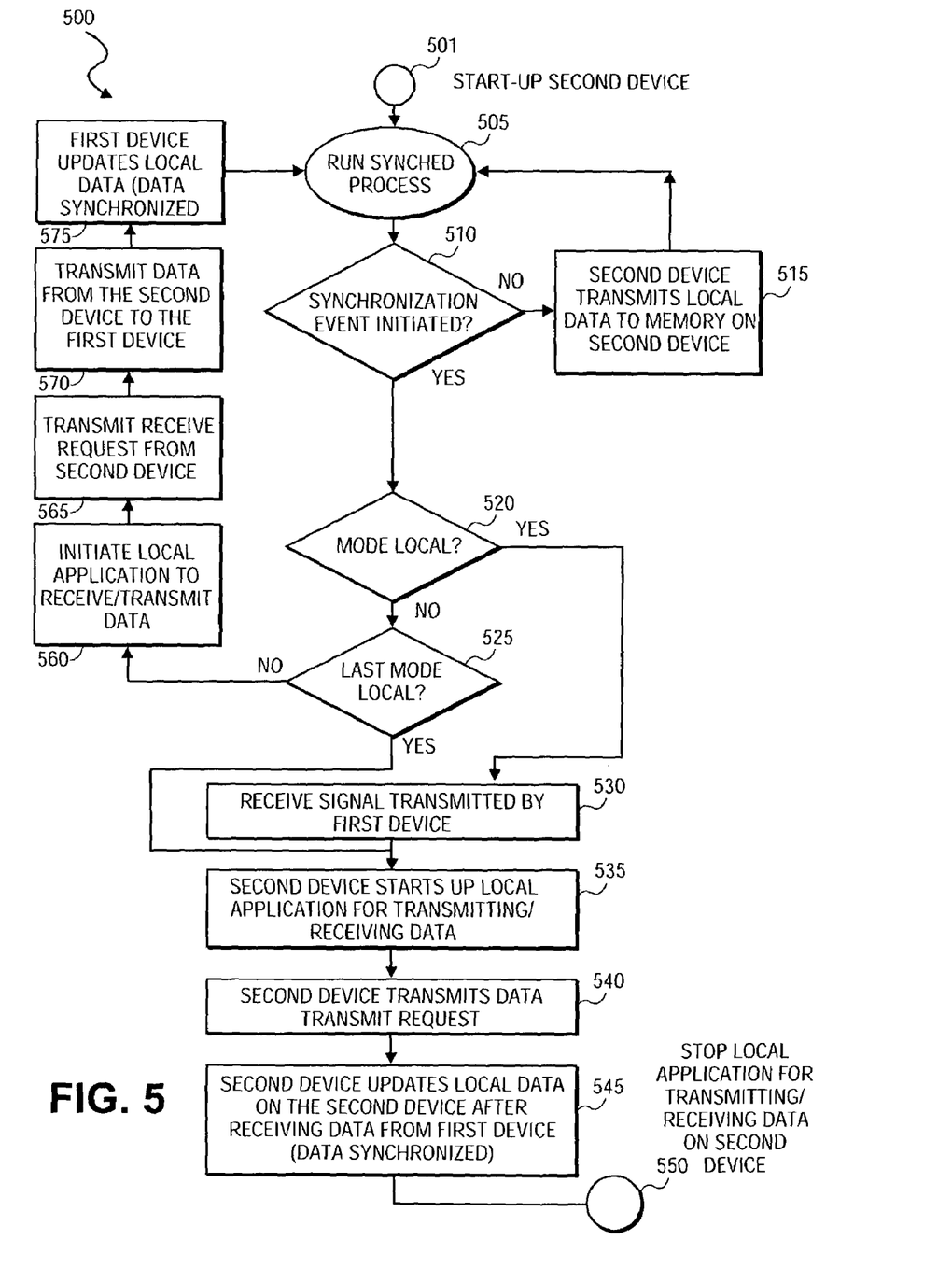
FIG. 5 illustrates a process for an embodiment from a second device's perspective.

FIG. 4 illustrates an embodiment including process 400 to synchronize state data between two or more devices from a first device perspective. FIG. 5 illustrates an embodiment including process 500 to synchronize state data between two or more devices from a second device perspective. Since the first device and the second device communicate with each other in order to synchronize data, each of the first and second device have functions and handshaking processes that interact with one another.

Process 400 illustrated in FIG. 4 will now be discussed. It should be noted that while two devices are used for illustration of different embodiments, more than two devices can use process 400 to synchronize state data. Reference 401 pertains to starting up of a first device. In this embodiment, first device is a device such as smart display 206. In block 405 a process or application (e.g., a remote control application) that can be run in local or remote mode is executed in order to be ran on the first device. Process 400 continues with block 413. Block 413 determines if the synchronization process or application should stop. One should note that many events can render a "yes" decision from block 413. For example, a user can manually stop process 400, a triggering event can stop process 400, a system error can stop process 400, etc. If block 413 determines that a stop of process 400 is not called for (i.e., "No"), process 400 continues with block 410.

In one embodiment, block 410 determines if a synchronization event occurs. In this embodiment, a synchronization event can occur automatically through events such as startup/shutdown of the process or application, startup/shutdown of the device, a predetermined time period (e.g., 1 minute, 5 minutes, 30 minutes, etc.), etc., through a manual operation, such as a user selecting synchronization to occur (e.g., a button, switch, selection window, etc.), or a combination of both manual and automatic. In another embodiment, block 410 is not necessary because the synchronization event is only manually selected by a user. If block 410 determines that a synchronization event did not occur, the first device transmits (i.e., stores) local data to state memory 225 or a registry, depending on implementations. It should be noted that in embodiments that do not constantly check (i.e. poll) for a synchronization event to occur, block 415 occurs directly after block 405. That is, the application or process to be ran in local or remote mode of the first device always stores state data to state memory device 225 or a registry, depending on implementation. In embodiments where block 410 is implemented, if block 410 determines that a synchronization event occurred, process 400 continues with block 420.

Block 420 determines the current and last mode of the first device. In other words, block 420 determines whether the process or application to be synched is in local mode (running on the first device, such as smart display 206) or in remote mode (running on a second device, such as base PC 205). If it is determined that the mode on the first device is local at block 425, process 400 continues with block 430. If it is determined that the current mode is not local, then process 400 continues with block 440.

Block 430 determines whether the last mode (i.e., the previous mode before the synchronization event occurred) was remote. In one embodiment, after it is determined that the last mode before the synchronization event was remote at block 430, process 400 continues with block 440. In block 440, the first device initiates a local application (e.g., a proxy process) for transmitting/receiving data to/from a second device (e.g., base PC 205, router 310, etc.). At block 441, the first device transmits a data request to the second device (e.g., synched process state data, application data, etc.). Process 400 continues with block 442 wherein the first device receives the requested data over the wireless communication link, or virtual channel from the second device. In block 443, process 400 updates the first device's data (i.e., state data, application data, etc.) with the latest data (i.e., state data, application data, etc.) from the second device. Therefore, after block 443, data between the first and second device is synchronized.

If block 425 determines that the first device's mode is local and block 430 determines that the previous mode of the first device before the synchronization event was also local, then process 400 continues with block 431. Block 431 transmits the first devices local data (i.e., state data, application data, etc.) to either state memory 225 or the registry, depending upon implementation. In one embodiment, after process 400 completes block 431, process 400 continues with block 435. In another embodiment, after block 431 is complete, process 400 continues with block 432 where the first device transmits a signal to the second device through the wireless communication link or virtual channel. The signal transmitted to the second device commands the second device to execute a process or application to transmit the last stored state or application data through an application or process, such as a proxy.

Process 400 continues with block 433 wherein the first device receives a data request from the second device in order to synchronize the second device's data with that of the first device's data. After the first device receives the request from the second device, the first device transmits the state or application data to the second device. Process 400 continues with block 434 where the second device updates its local data with the state or application data from the first device. Therefore, the state or application data between the first device and the second device become synchronized.

Process 400 then continues with block 435, which determines to either stop the synchronization process or application on the first device or not. In one embodiment, if the synchronization event occurs manually, the synchronization process (which is isolated from the application desired to be synchronized) is automatically stopped after block 434 completes. In embodiments where the synchronization event is automatic or manual, block 435 branches to the "Yes" branch upon a shutdown sequence. That is, a shutdown sequence can cause a synchronization event occurrence. If block 435 determines to not stop the process or application, process 400 continues with block 405.

As indicated above, FIG. 5 relates to the process or application to have its data synchronized from the second device's perspective. Process 500 begins with the start-up of the second device. In one embodiment, the startup event is an automatic synchronization event. In embodiments where a synchronization event occurs manually, block 510 is not included in process 500 and the synchronization process is isolated from the process or application to be synchronized. In embodiments having manual and automatic, or only automatic occurrences of synchronization events, if block 510 determines that no synchronization event occurred, process 500 continues with block 515.

In one embodiment, in block 515 the second device transmits its local data to normal memory (i.e., memory typically used by applications or processes, such as RAM, SDRAM, or other volatile memory devices). In another embodiment, block 515 can transmit second devices process or application data to normal memory and a state memory, such as state memory 225, just state memory 225, or to another memory device, either local or external (including memory devices in a WAN, LAN, Internet service provider location, etc.). In embodiments including block 510, if a synchronization event is determined to have occurred, process 500 continues with block 520.

Block 520 determines whether the process or application to be synchronized is running in local mode. In one embodiment, the determination of mode only occurs on the first device. In this embodiment, the concept of local and remote mode relates only to the first device and not the second device (i.e., the second device does not operate based on these modes). In another embodiment, the determination of mode occurs on either the first device, the second device, or both devices. If block 520 determines that the process or application to be synchronized is not running in local mode, process 500 continues with block 525. If block 520 determines that the process or application to be synchronized is running in local mode, process 500 continues with block 530. Block 525 determines whether the previous mode before the synchronization event was local or not. If block 525 determines that the previous mode was local, then process 500 continues with block 535. If block 525 determines that the previous mode was not local, then process 500 continues with block 560.

In one embodiment, the second device drives the synchronization event. In this embodiment, in block 560, an application or process (e.g., a proxy) is initiated on the second device in order to transmit data from the second device to the first device. After block 560 completes, block 565 transmits a data receive request to the first device in order to transmit data for synchronizing the data between the two devices. Process 500 continues with block 570 where the data transmitted from the second device to the first device is received by the first device. In another embodiment, the first device drives the synchronization event. In this embodiment, in block 560, an application or process (e.g., a proxy) is initiated on the first device in order to receive data from the second device. After block 560 completes, block 565 receives a data receive request from the first device in order for the second device to transmit data for synchronizing the data between the two devices. Process 500 continues with block 570 where the data transmitted from the second device to the first device is received by the first device.

Process 500 continues with block 575 where the first device updates its local data in state memory 225 or a registry, depending on implementation. After block 575 is completed, the process or application data between the first device and the second device is synchronized.

If block 520 determines that the current mode is local, in block 530 the second device receives a signal transmitted from the first device commanding a resident application or process initiate. The resident process or application allows the first device and the second device to transmit/receive synchronization data over a wireless virtual channel. If block 525 determines that the previous mode before the synchronization occurrence was local, or if block 530 completes after it is determined by block 525 that the previous mode before the synchronization occurrence was local, process 500 continues with block 535.

Block 535 initiates the resident application or process on the second device to transmit/receive synchronization data. After block 535 is completed, in block 540 the second device transmits a data transmit request to the first device. After the first device receives the transmit request, in block 545 the first device transmits the state or application data to the second device and the second device updates its local data with the state or application data from the first device. After block 545 has completed, the state data is synchronized between the first and second devices. Process 500 continues with block 550 where the resident program or process for transmitting/receiving synchronization data is stopped.

In another embodiment, the second device always runs the transmit/receive synchronization resident application or process. In another embodiment, the second device always runs the transmit/receive synchronization resident application or process while it is running the application or process to be synchronized.

In one embodiment, the first device initiates its resident transmit/receive application or process (e.g., a proxy process) upon the initiation of a remote session (i.e., the synched process or application is in remote mode).

The presented embodiments allow a smart display, such as device 206, and a base PC, such as device 205, to run a process or application that is run modally on the smart display without a user having to be aware of the modal process or application's state, or whether the device is running in a local or remote mode. By allowing two or more devices to have the state or application data synchronized, either manually or automatically, a user can be assured that the smart display device and base PC are always synchronized with the latest state or application data. In the example where the smart display is used as a smart remote control device, the user can switch back and forth between devices without need of manually updating each device.

The above embodiments can also be stored on a device or medium and read by a machine to perform instructions. The device or medium may include a solid-state memory device and/or a rotating magnetic or optical disk. The device or medium may be distributed when partitions of instructions have been separated into different machines, such as across an interconnection of computers.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. An apparatus comprising:
   a processor coupled to a main memory; the processor including a data synchronization process,
   a state memory coupled to the processor,
   a display coupled to the processor,
   an interface coupled to the processor, and
   a transmitting/receiving device coupled to the processor, wherein the synchronization process transmits data to the state memory and to an external device to synchronize program data in the external device with program data in the apparatus, where the program data in the external device and the program data in the apparatus are used in a program to run in one of the apparatus and the external device where the program is run sequentially from one of the apparatus to the external device, and the external device to the apparatus, and the program is run in a local mode on the apparatus and the program is run in a remote mode when run on the external device, the program cannot run on both the apparatus and the external device simultaneously, the apparatus acts as a user interface when the program is run in the remote mode, and the apparatus acts as the user interface and controls logic for the program when the program is run in the local mode.

2. The apparatus of claim 1, wherein the state memory is one of a registry, a memory device, a text file, and a database.

3. The apparatus of claim 1, wherein the transmitting/receiving device communicates with an external transmitting/receiving device coupled to the external device.

4. The apparatus of claim 1, wherein the synchronization process is started manually through the interface.

5. The apparatus of claim 1, wherein the synchronization process is started automatically based on an event.

6. The apparatus of claim 5, wherein the event is based on a predetermined amount of time.

7. The apparatus of claim 5, wherein the event is based on a change of mode.

8. The apparatus of claim 1, wherein the apparatus further comprises:
   a resistive digitizer coupled to the processor;
   an audio device coupled to the processor; and
   a peripheral component coupled to the processor.

9. The apparatus of claim 8, wherein the peripheral component one of reads data and writes data to a removable article.

10. The apparatus of claim 1, wherein the data is state data, and the synchronization process replaces the state data stored in the state memory with local state data from the external device.

11. The apparatus of claim 1, wherein the data is state data, and the synchronization process replaces the local data stored on the external device with the state data stored in the state memory.

12. A system comprising:
    a first device and a second device, the first device including:
    a processor coupled to a main memory; the processor including a state data synchronization process,
    a state memory coupled to the processor,
    a display coupled to the processor,
    an interface coupled to the processor, and
    a transmitting/receiving device coupled to the processor;
    wherein the second device communicates with the first device using a wireless virtual channel, and the state synchronization process transmits state data to the state memory to synchronize program data in the first device with program data in the second device, where the program data in the first device and the program data in the second device are used in a program to run in one of the first device and the second device where the program is run sequentially from one of the first device to the second device, and the second device to the first device, the program is run in a local mode on the first device and the program is run in a remote mode when run on the second device, the program cannot run on both the first device and the second device simultaneously, the first device acts as a user interface when the program is run in the remote mode, and the first device acts as the user interface and controls logic for the program when the program is run in the local mode.

13. The system of claim 12, wherein the state synchronization process transmits state data from the first device to the second device to synchronize state data between the first and the second device.

14. The system of claim 12, wherein the state synchronization process transmits state data from the second device to the first device to synchronize state data between the first and the second device.

15. The system of claim 12, wherein the state memory is one of a registry, a memory device, a text file, and a database.

16. The system of claim 12, wherein the second device includes a transmitting/receiving device to communicate with the first device.

17. The system of claim 12, wherein the state synchronization process is initiated manually through the interface.

18. The system of claim 12, wherein the state synchronization process is initiated automatically based on an event.

19. The system of claim 18, wherein the event is based on one of a predetermined amount of time, a state of a process, and a change of mode.

20. The system of claim 12, wherein the first device transmits a signal to the second device to initiate a transmitting/receiving process on the second device.

21. The system of claim 12, wherein a transmit/receive process is initiated on the first device if the second device is in a remote mode.

22. A method comprising:
    transferring synchronization data to a memory on a first device;
    initiating a synchronization event;
    determining a mode of the first device;
    requesting synchronization state data from the first device; and
    synchronizing the state data between the first device and a second device,
    wherein program data in the first device is synchronized with program data in the second device, where the program data in the first device and the program data in the second device are used in a program to run in one of the first device and the second device where the program is run sequentially from one of the first device to the second device, the second device to the first device, and the program is run in a local mode on the first device and the program is run in a remote mode when run on the second device, the program cannot run on both the first device and the second device simultaneously, the first device acts as a user interface when the program is run in the remote mode, and the first device acts as the user interface and controls logic for the program when the program is run in the local mode.

23. The method of claim 22, further comprising:
transmitting synchronization data from the first device to the second device.

24. The method of claim 23, wherein the second device communicates with the first device using a wireless virtual channel, and transmitting the synchronization data to the second device aligns data between the first and the second device.

25. The method of claim 22, further comprising: transmitting synchronization data from the second device to the first device.

26. The method of claim 25, wherein the second device communicates with the first device using a wireless virtual channel, and transmitting the synchronization data to the first device aligns data between the first and the second device.

27. The method of claim 22, wherein initiating the synchronization event is manual through an interface.

28. The method of claim 22, wherein initiating the synchronization event is automatic.

29. The method of claim 22, wherein initiating the synchronization event is based on one of a predetermined amount of time and a change of mode.

30. An apparatus comprising a machine-readable medium containing instructions which, when executed by a machine, cause the machine to perform operations comprising:
transferring synchronization data to a memory on a first device;
initiating a synchronization event;
determining a mode of the first device;
requesting synchronization state data from the first device; and
synchronizing the state data between the first device and a second device,
wherein program data in the first device is synchronized with program data in the second device, where the program data in the first device and the program data in the second device are used in a program to run in one of the first device and the second device where the program is run sequentially from one of the first device to the second device, and the second device to the first device, and the program is run in a local mode on the first device and the program is run in a remote mode when run on the second device, the program cannot run on both the first device and the second device simultaneously, the first device acts as a user interface when the program is run in the remote mode, and the first device acts as the user interface and controls logic for the program when the program is run in the local mode.

31. The apparatus of claim 30, further comprising:
transmitting synchronization data from the first device to the second device.

32. The apparatus of claim 31, wherein the second device communicates with the first device using a wireless virtual channel, and the instruction causing the machine to perform transmitting the synchronization data to the second device aligns data of the first and the second device.

33. The apparatus of claim 30, further comprising:
transmitting synchronization data from the second device to the first device.

34. The apparatus of claim 33, wherein the second device communicates with the first device using a wireless virtual channel, and the instruction causing the machine to perform transmitting the synchronization data to the first device aligns data of the first and the second device.

35. The apparatus of claim 30, wherein instruction causing the machine to perform initiating the synchronization event is one of manually initiated through an interface and automatic based on one of a predetermined amount of time and a change of mode.

* * * * *